(No Model.)
C. H. MASCHMEYER.
HANDLE.
No. 485,846. Patented Nov. 8, 1892.
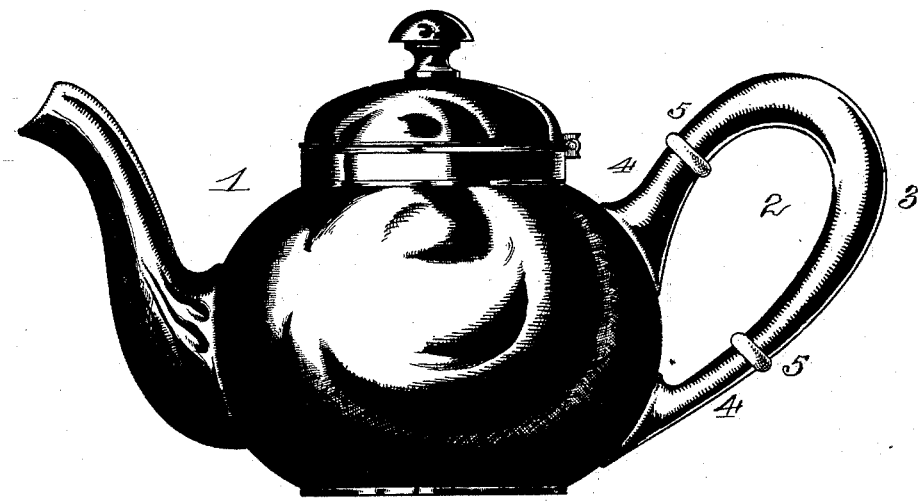
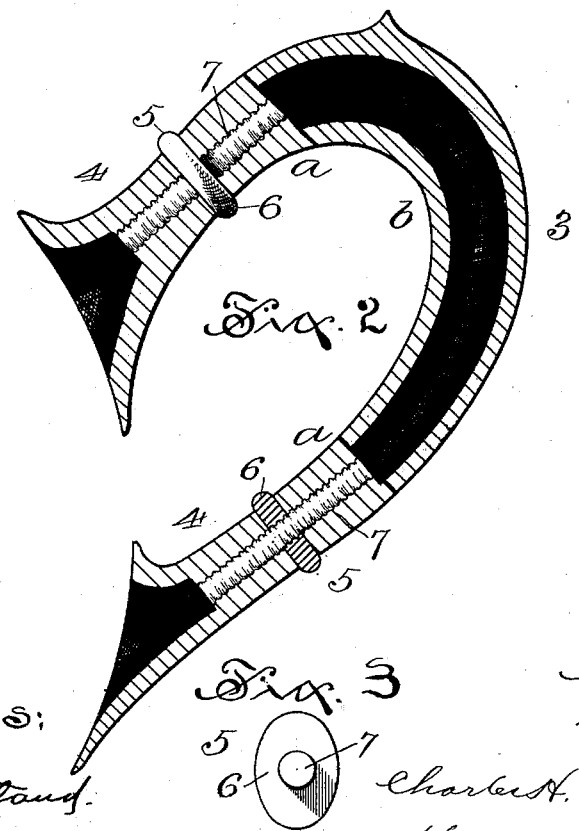
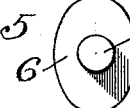
Witnesses:
C. E. Buckland.
P. A. Phelps
Inventor:
Charles H. Maschmeyer,
by
Harry P. Williams
Atty.

UNITED STATES PATENT OFFICE.

CHARLES H. MASCHMEYER, OF HARTFORD, CONNECTICUT, ASSIGNOR TO THE HARTFORD SILVER PLATE COMPANY, OF SAME PLACE.

HANDLE.

SPECIFICATION forming part of Letters Patent No. 485,846, dated November 8, 1892.

Application filed April 13, 1892. Serial No. 429,006. (No model.)

*To all whom it may concern:*

Be it known that I, CHARLES H. MASCH-MEYER, a citizen of the United States, residing at Hartford, in the county of Hartford and State of Connecticut, have invented certain new and useful Improvements in Handles, of which the following is a full, clear, and exact specification.

The invention relates to the handles of tea, coffee, or other pots, water-vessels, and similar receptacles for containing hot or boiling liquids, decoctions, or beverages that are provided with an insulation to prevent the transference of heat from the vessel to the handle, the object being to provide a simple and cheap handle for this purpose which will be firmly and lastingly constructed and insure complete insulation, the construction being more particularly intended for pots with handles formed from soft metal.

Referring to the accompanying drawings, Figure 1 is a side view of a pot with one of the improved handles. Fig. 2 is an enlarged section of a handle, and Fig. 3 is a face view of an insulator.

In the views, 1 indicates a tea, coffee, or other pot or vessel, formed to shape by any mode commonly employed for such hollow ware, in which liquid that is hot or is to be heated is poured. The handle 2 is formed after any desired pattern and secured to the body of the pot in any common manner, as by brazing, soldering, or riveting. This handle, preferably made of soft metal, as britannia, consists of the hand-section 3, which is grasped by the hand in lifting, the attachment-sections 4, which connect the hand-section with the body of the pot, and the insulators 5, which join the adjacent ends of the sections. These insulators consist of buttons or disks 6, of pearl, ivory, bone, vegetable ivory, or a similar heat-non-conducting substance or composition, which completely divide and separate the adjacent ends of the hand-section and the attachment-sections. Passing through the center of these disks and projecting into sockets of the same size in the respective adjacent ends of the hand and attachment sections are rods, stems, or cylinders 7 of the same or a similar insulating or heat-non-conducting material. These stems may of course be integral with the disks, but preferably are made of a separate piece of cheaper material, and are roughened, corrugated, threaded, or made with a varying cross-sectional diameter, so that the metal will more firmly grasp and hold to the insulator and prevent the sections from pulling apart.

In the process of manufacture the disks are slipped upon the roughened stems and these insulators placed in a suitable mold and the sections cast about them, so that the metal flows closely against the disks and tightly fits or fills into the roughenings of the stems, so that the sections cannot be pulled from them. Of course, if desired, the grasping or hand section of the handle may also be formed in other sections, the solid sections *a* being cast around the insulator-stems and the hollow section *b* brazed, soldered, or otherwise afterward secured to the sections connected to the insulators.

The sections of this handle are firmly secured together, so that they cannot be pulled apart nor work loose by the stretching of the metal, without any fine work. There are no holes to be bored for fastening-pins, which require careful fitting to insure a tight handle and to prevent the insulator from cracking. There is sufficient metal about the insulator to prevent its stretching and working loose, and the insulating-disk is not discolored by soldering-oil, acid, or flame.

The completed handle is strong, durable, ornamental, and cheap and the sections are completely insulated by an ornamental disk and can be held together by a cheaper but just as non-conducting substance, which is firmly embedded in the metal.

I claim as my invention—

1. A handle for vessels, consisting of a hand-section, attachment-sections, and insulators between the adjacent ends of the sections, said insulators having stems with a roughened surface projecting into sockets having complementary roughenings in the ends of the adjacent sections, substantially as specified.

2. A handle for vessels, consisting of a hand-section, attachment-sections, and insulators between the adjacent ends of the sections, said insulators consisting of roughened stems supporting disks, the roughened stems projecting into complementary roughened sockets in the adjacent ends of the sections, substantially as specified.

3. A handle for vessels, formed in separate sections of cast metal and pieces of heat-nonconducting material consisting of a disk and indented stem, the metal of the sections being cast about the stems, so that the sections are held together by the insulators only, which completely separate metal from metal, substantially as specified.

CHARLES H. MASCHMEYER.

Witnesses:
R. P. CHAPMAN,
H. R. WILLIAMS.